United States Patent [19]
Rzeszewski

[11] Patent Number: 5,512,958
[45] Date of Patent: Apr. 30, 1996

[54] SYSTEM FOR CONTROLLING THE EFFECTS OF NOISE IN TELEVISION RECEIVERS

[75] Inventor: Thoedore S. Rzeszewski, Lombard, Ill.

[73] Assignee: Matsushita Electric Corporation of America, Franklin Park, Ill.

[21] Appl. No.: 235,500

[22] Filed: Apr. 29, 1994

[51] Int. Cl.⁶ ................................................ H04N 5/21
[52] U.S. Cl. ...................................... 348/607; 348/683
[58] Field of Search ................................. 348/607, 665, 348/666, 664, 616, 614, 618, 725, 705, 683, 734, 731, 732; 358/127, 336; H04N 5/21, 5/213, 5/217

[56] References Cited

U.S. PATENT DOCUMENTS

| 4,167,020 | 9/1979 | Holmes ................................ 358/36 |
| 4,353,093 | 10/1982 | Durbin, Jr. et al. . |
| 4,368,483 | 1/1983 | Liu . |
| 4,377,823 | 3/1983 | Mycynek ............................. 358/157 |
| 4,398,210 | 8/1983 | Liu et al. . |
| 4,413,282 | 11/1983 | Wargo . |
| 4,498,104 | 2/1985 | Schulz . |
| 4,514,763 | 4/1985 | Rindal . |
| 4,517,600 | 5/1985 | Reitmeier . |
| 4,614,971 | 9/1986 | Maney et al. ........................ 358/147 |
| 4,635,104 | 1/1987 | Hausdorfer . |
| 4,646,153 | 2/1987 | Fukuda et al. ...................... 358/167 |
| 4,684,989 | 8/1987 | Roeder et al. . |
| 4,972,511 | 11/1990 | Singer et al. ........................ 455/226 |
| 5,032,915 | 7/1991 | Ichimura . |
| 5,053,890 | 10/1991 | Ito et al. . |
| 5,144,414 | 9/1992 | Nishi et al. . |
| 5,231,680 | 7/1993 | Williams . |
| 5,386,534 | 11/1995 | Sibigfroth et al. .................. 395/400 |

Primary Examiner—James J. Groody
Assistant Examiner—Nina West
Attorney, Agent, or Firm—Willian Brinks Hofer Gilson & Lione

[57] ABSTRACT

A television receiver having a microprocessor controlled disturbance control system that can operate totally under user control or automatically. The microprocessor generates an on-screen menu which presents noise control options to the user. In the preferred embodiment, the menu options allow the user to ameliorate the effects of impulse noise disturbances, longer duration disturbances, continuous wave form (CW) disturbances, or some combination of the three, without requiring the user to understand the nature of these disturbances. The present invention also provides compensation circuitry for reducing the effects of impulse noise in the video signal that is controlled by responding to the high frequency luminance signal produced by a comb filter, and also responding to the composite video picture signal. High frequency luminance and amplitude variations that are outside of the composite video signal range are indicative of the presence of impulse noise. These variations are detected and used to produce a control signal for activating tracking and hold circuitry for reducing the effect of the impulse.

27 Claims, 5 Drawing Sheets

TIME

FREQUENCY

SYSTEM FOR CONTROLLING THE EFFECTS OF NOISE IN TELEVISION RECEIVERS

FIELD OF THE INVENTION

The present invention relates in general to television receiver circuitry. More particularly, it relates to circuits and methods for controlling the effects of various types of noise signals that may be experienced during analog television reception.

BACKGROUND OF THE INVENTION

Television receivers are vulnerable to noise signals from various sources. The interference usually results from electromagnetic radiation which interferes with the broadcast RF signal. Typical sources of such interference are automotive ignition systems and household motors such as washing machines, dryers and refrigerators. Similar types of interference may also be caused in a broadcast RF signal by high definition television systems and digitized 525 line systems. The interfering signals often appear as bright or dark spots on the television screen.

The patent literature describes numerous approaches to reducing or eliminating the problems caused by interference in broadcast television and/or video signals. The general approach to the problem has been to design circuits that combat the effects of interfering signals, and then place these circuits in the signal path of the incoming television/video signal. Unfortunately, few circuit designs deal effectively with more than one type of interference. Accordingly, if it is desired to combat four types of interference, the television receiver will typically have four interference compensation circuits placed in its incoming signal path. Each of the four circuits process the incoming signal regardless of whether interference is present, and regardless of whether the interference is the type that the particular circuit is designed to respond to. Also, such schemes may actually cause interference because a given circuit could react unpredictably when exposed to a type of interference that it was not designed to combat, or when trying to correct problems that have already been acted on by another circuit.

Because television pictures are formed by scanning an image and partitioning that image into a plurality of horizontal lines, the signal information from image line to image line is highly redundant for a significant percentage of images. The horizontal lines are sequentially transmitted to the television's receiver circuitry where they are reconstructed, line by line, into the original image and shown on the television screen.

U.S. Pat. No. 2,996,576, issued to Dolby, discloses a system which takes advantage of the line to line signal redundancy inherent in scanning and partitioning images, and minimizes the effect of television signal disturbances in video recording/reproducing systems such as video recorders and video disk systems. Video signals are typically recorded as a frequency modulation (FM) of a carrier. The Dolby system responds to disturbing signals that have sufficient amplitude to cause loss of the FM carrier. Thus, video signal loss may be detected by detecting the loss of the FM carrier. This is commonly referred to as "envelope detection." Upon detection of a video signal loss, the signal for the preceding image line, which is delayed by one image line period, is substituted for the lost signal to minimize picture disturbance.

The relatively large number of defects in video recording media makes it imperative to include signal compensation systems in video recording/reproducing apparatus. U.S. Pat. No. 5,032,915, issued to Ichimura, discloses such a noise detection and dropout sensing and compensation circuit for use in video recorders.

By contrast, it was, for a period of time, too costly to include such interference correction systems in consumer television receivers. However, with the incorporation of charge transfer device delay lines in television receivers to perform comb filtering of the luminance signal, it has become practical in consumer televisions to consider correcting interference signals such as, for example, impulse noise. The interference correction can be performed by video signal substitution as in video recording/reproducing systems. However, the detection of noise or defects in broadcast television signals presents different problems than those encountered in video recording/reproducing systems.

One such difference occurs where the interference or noise creating the picture disturbance does not have sufficient amplitude, as would an impulse-type noise, to eliminate the broadcast signal carrier. In those cases, one cannot rely upon envelope detection of the broadcast signal carrier to determine when defects are present in the signal. In addition, television signals are broadcast as an amplitude modulated carrier so that amplitude changes are generally not indicative of the presence of noise or signal defects. In other words, because the dynamic amplitude range of the baseband video signal is very large, noise can have amplitudes ranging from barely perceptible to large enough to overload the receiver circuit.

U.S. Pat. No. 4,353,093, issued to Durbin, recognized that impulse noise, i.e., a noise signal that may supersede the video signal on all or a part of an image line, typically has a broad energy spectrum and causes interference across many television channels. Therefore, energy from the impulse is likely to be included in the sound component of a particular television signal even though the sound component is broadcast on a carrier separate from the video signal component of the particular television signal. Because the sound component is a high frequency modulated wave form in the baseband TV signal, amplitude detection of such a signal can be used for effectively detecting the presence of relatively small values of narrow duration/wider bandwidth noise.

In the Durbin patent, a phase-locked loop (PLL) synchronous detector arrangement is responsive to a bandpass filtered version of the modulated sound carrier for detecting amplitude variations of the sound carrier. Compensation circuitry, including a delay line, coupled to the output of the synchronous detector substitutes a prior image line for the present image line in response to the level of the detected amplitude variations. In addition to this PLL synchronous detector arrangement for detecting impulse noise, conventional intercarrier detection circuitry is required for detecting the audio and video information from the composite television signal.

U.S. Pat. No. 4,514,763, issued to Rindal, takes the same basic approach as the Durbin patent to eliminating impulse noise. The Rindal patent, however, uses a PLL for detecting the audio information and providing a defect control signal for reducing impulse noise. One drawback of using audio high frequencies (which are not in the video channel) is that the sound channel could be affected when the video is not, or vice versa. Thus, the reliability of such systems is compromised.

Thus, currently available television signal noise reduction systems do not provide the user with sufficient control over how and when the individual noise reduction circuits are used. Accordingly, the available systems do not counteract the potentially unpredictable reaction of a noise reduction circuit when it receives a type of noise or other signals that it was not designed to process.. Also, the individual circuits available for combating interfering signals such as impulse noise, for example, do not provide sufficient reliability.

SUMMARY OF THE INVENTION

Thus, it is an object of the present invention to provide a circuit and method for organizing and controlling the individual interference compensation circuits that comprise a television noise reduction control system.

It is another object of the present invention to provide a television noise reduction control system which allows the user to control how and when individual interference compensation circuits in the system are used.

It is another object of the present invention to provide a television noise reduction control system in which a particular interference compensation circuit in the system is activated only when needed.

It is another object of the present invention to eliminate the potentially unpredictable reaction of a television interference compensation circuit when it receives a type of noise or other signals that it was not designed to process.

It is another object of the present invention to provide more reliable individual television interference compensation circuits for use alone or in a television noise reduction control system.

These and other objects are realized in accordance with the present invention by providing a circuit and method for controlling the effects of noise signals received by a television receiver. The circuit includes an on-screen disturbance control menu system. Each on-screen menu option enables an individual circuit designed to reduce the effects of a particular types of noise in the composite video picture signal, including compensation circuitry for reducing the effects of impulse noise signals, longer-duration noise signals, and CW noise signals. The interference compensation circuits are arranged in a cascade manner, and may operate alone or in combination.

The on-screen disturbance control menu system of the present invention is controlled by a microcomputer/processor (MPU). The on-screen menu system is totally under user control, allowing the user to ameliorate the effects of impulse noise disturbances, longer duration disturbances and/or CW disturbances without requiring the user to understand the nature of these disturbances. The user simply chooses the method that works the best. Alternatively, the MPU may be programmed to automatically scan through the compensation circuit options, and the user can stop the scan once it reaches a circuit that solves the problem. Also, the MPU may be programmed to automatically scan through the compensation circuit options, and then automatically choose the compensation circuit that reacts to and solves the problem. Also, the MPU could be programmed to automatically enable the appropriate compensation circuit when a detection circuit detects a particular type of interference.

Another aspect of the present invention is a circuit for processing a composite video signal and a high frequency luminance signal. The high frequency luminance signal is produced by a comb filter that separates the chrominance and luminance signals. The processing circuitry detects the composite video signal and the high frequency luminance signal, and enables compensation circuitry for reducing the effects of impulse noise in the composite video signal depending on an assessment of both signals. The detection circuitry includes a comparator for sensing when the amplitude of the composite video signal exceeds a first predetermined value, a second comparator for sensing when the amplitude of the composite video signal is less than a second predetermined value, and a third comparator for sensing when the high frequency luminance signal exceeds a third predetermined value. The output of the detection circuitry is used to produce a control signal to enable a tracking and hold circuit, which holds the video signal level at the level of the video signal received just prior to activation of the tracking and hold circuit.

The above-described circuit uses high frequency video together with the composite video signal in order to flag the presence of an impulse. This improved method of detecting the impulse is not just level-dependent, but also uses detection of high frequency energy. If both the level dependent and high frequency energy detection circuits indicate the need, the tracking and hold circuitry will hold the picture signal at the level that occurred just previous to the disturbance to minimize picture distortion.

Accordingly, the present invention achieves several advantages. In particular, the circuit and method of the present invention provides apparatus and method for organizing and controlling the individual circuits that comprise a television noise reduction control system. The invention, further provides a television noise reduction control system which allows the user to control how and when individual noise reduction circuits in the system are used. The present invention also reduces the potentially unpredictable reactions of a noise reduction circuit when it receives a type of noise or other signals that it was not designed to process. This is accomplished by allowing the user to activate an individual noise reduction circuit in the system only when it is needed. Finally, the inventions provide reliable individual television noise reduction circuits which can be used alone or in a television noise reduction control system.

DETAILED DESCRIPTION OF THE PRESENTLY PREFERRED EMBODIMENTS

Prior to the present invention, the general approach to compensating for picture distortion caused by interference signals in broadcast television and/or video signals has been to permanently place the desired interference compensation circuits in the signal path of the incoming television/video signal. While there are some circuits which allow a user to deal with one type of noise, such as gaussian noise, few circuit designs deal effectively with more than one type of interference. Accordingly, a television receiver that is designed to combat four types of interference will typically need to have four interference compensation circuits permanently placed in the incoming signal path. Each of the four circuits processes the incoming signal regardless of whether interference is present, and regardless of whether the interference present is the type that the particular circuit is designed to respond to. Also, such schemes may actually cause picture distortion because a given circuit could react unpredictably when exposed to a type of interference that it was not designed to combat, or when trying to correct problems that have already been acted on by another circuit.

Figure 1:
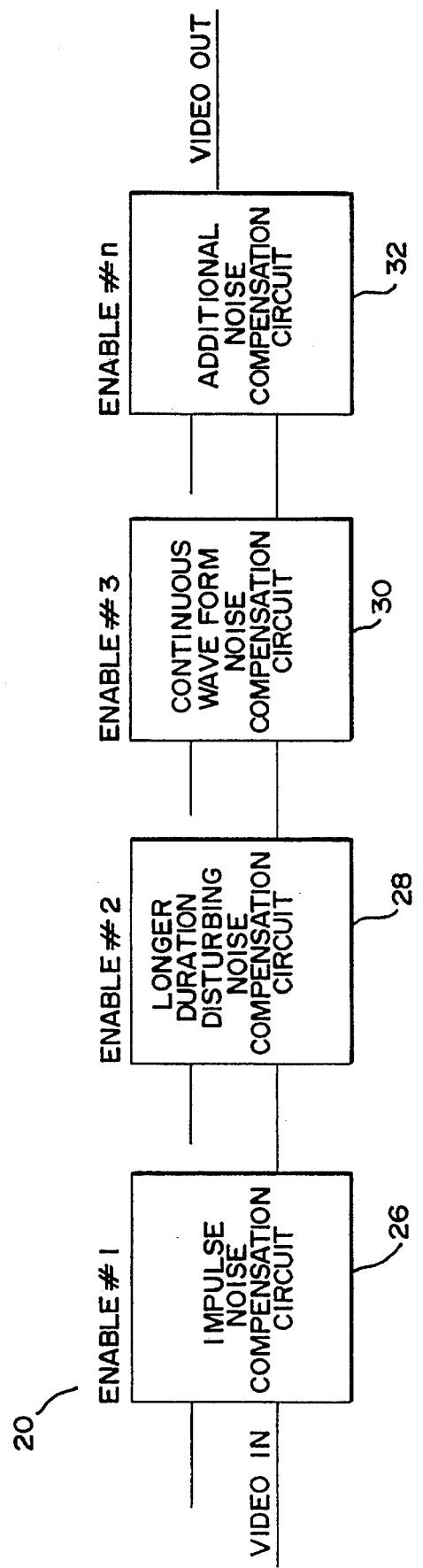
FIG. 1 is a block diagram of a television noise reduction control system embodying the present invention.

FIG. 1 is a block diagram of a television noise reduction control system 20 which embodies the present invention and solves the problems described above. The illustrated embodiment is a circuit and method of selectively enabling one or more desired interference compensation circuits via an MPU controller 24, shown in FIG. 2. The MPU 24 may be the same MPU that controls the tuning and other control functions of a conventional consumer television receiver.

The MPU 24 is programmed to enable or disable a variety of interference compensation circuits as instructed by the user. The user provides instructions to the MPU 24 through an on-screen menu, allowing the user to enable or disable a series of compensation circuits by pushing the designated buttons on the television receiver or a remote control. FIG. 1 illustrates three specific types of compensation circuits—an impulse noise compensation circuit 26, a longer duration noise compensation circuit 28, and a CW noise compensation circuit 30. FIG. 1 also illustrates that any number of additional noise compensation circuits 32 could be added to the system 20. When a compensation circuit is enabled by the user, it receives the incoming television/video signal and acts on the particular type of interference that the compensation circuit was designed to combat. When a compensation circuit is disabled by the user, the compensation circuit passes the television/video signal without significant modification.

The on-screen control menu offers options which correspond to the compensation circuits illustrated in FIG. 1. For example, setting A on the on-screen menu could correspond to the impulse noise compensation circuit 26, setting B to the longer-duration noise compensation circuit 28, and setting C to the CW noise compensation circuit 30. The compensation circuits are arranged in a cascade manner, and may be enabled by the MPU 24 to operate alone or in combination.

An important feature of the present invention is that the user is not required to understand and recognize the type of interference being experienced in order to use the system 20. The circuits are easily enabled and disabled by the user through the on-screen menu and the MPU 24, allowing the user to simply cycle through the circuit options and choose the appropriate option. Alternatively, the MPU 24 may be programmed to automatically scan through the compensation circuit options, allowing the user to stop the scan once it reaches a circuit that solves the problem. Also, the MPU 24 may be programmed to both automatically scan and choose the appropriate compensation circuit option to solve an interference problem. Also, the MPU 24 could be programmed to automatically enable the appropriate compensation circuit when a detection circuit, such as the longer duration disturbance signal detection circuit 73 or the CW detection circuit 77 shown in FIG. 2, detects a particular type of interference.

Figure 2:
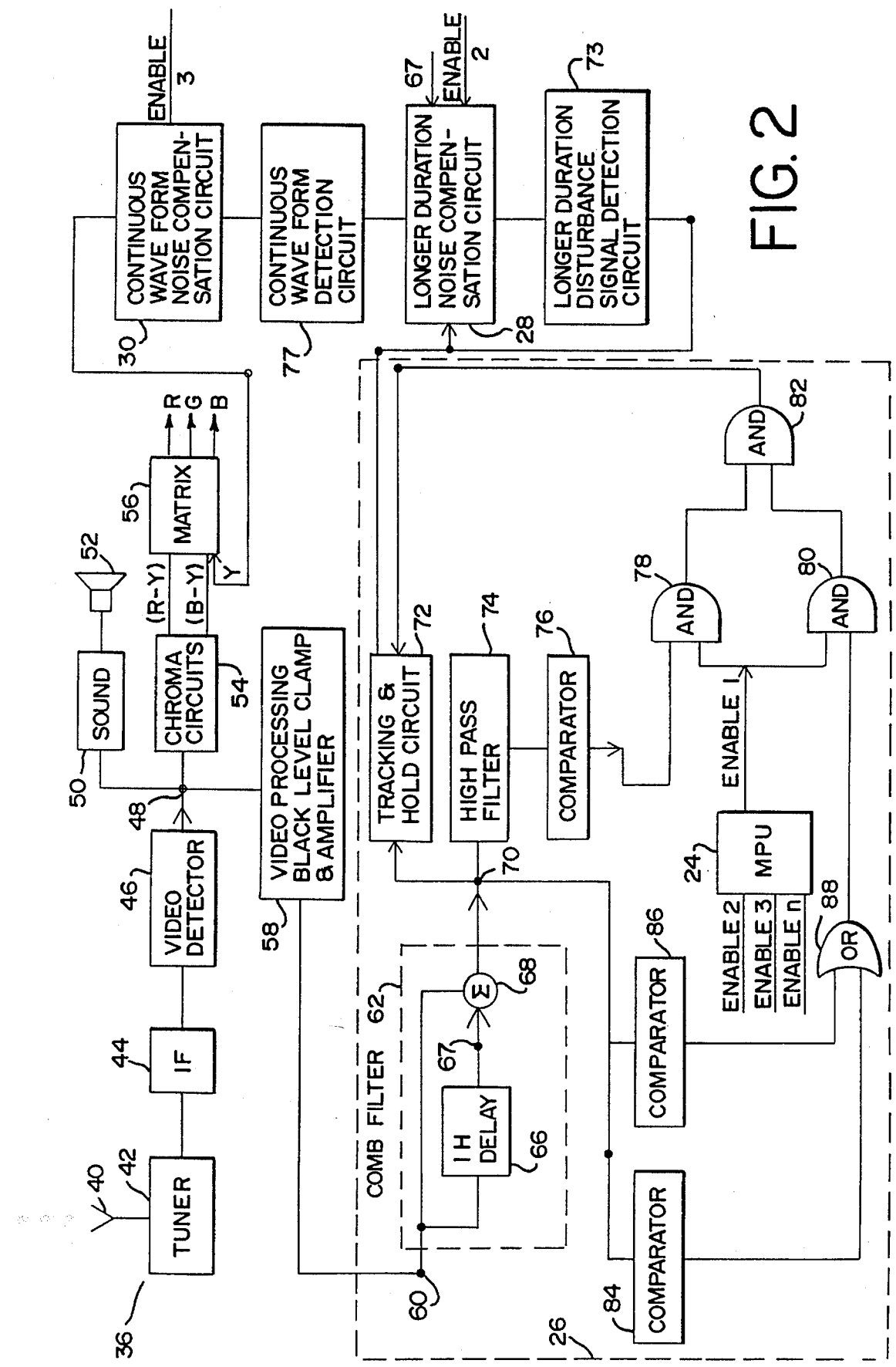
FIG. 2 is a block diagram of a television receiver circuitry embodying another preferred embodiment of the present invention.

The system 20 illustrated in FIG. 1 may be used with any type or number of compensation circuits. However, the preferred system 20 includes compensation circuits for combating at least impulse noise, longer-duration noise, and CW noise. FIG. 2 illustrates a block diagram of television receiver circuitry 36 that uses the preferred system 20 of compensation circuits.

The circuit 26 is specifically designed to reduce the effects of impulse noise in a composite video signal. Signals are normally identified by their properties in the time and frequency domain. An ideal impulse signal is infinitesimally narrow in the time domain, and has an infinitely large amplitude. The corresponding frequency domain impulse signal has a constant energy density for all frequencies.

Figure 3:
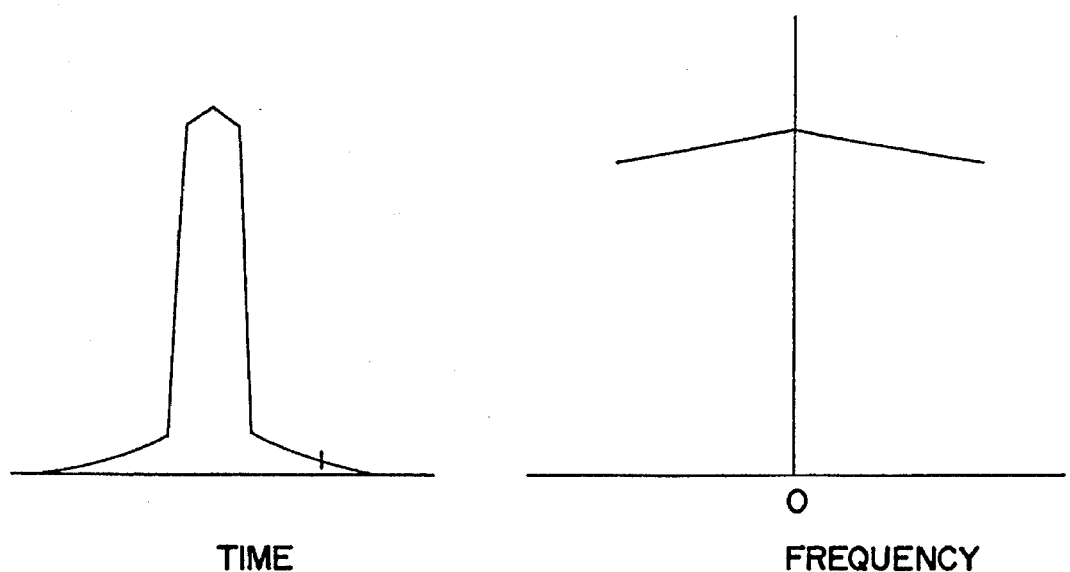
FIG. 3 illustrates a traditional mathematical representation of a system impulse response in the time and frequency domains.
Figure 4:
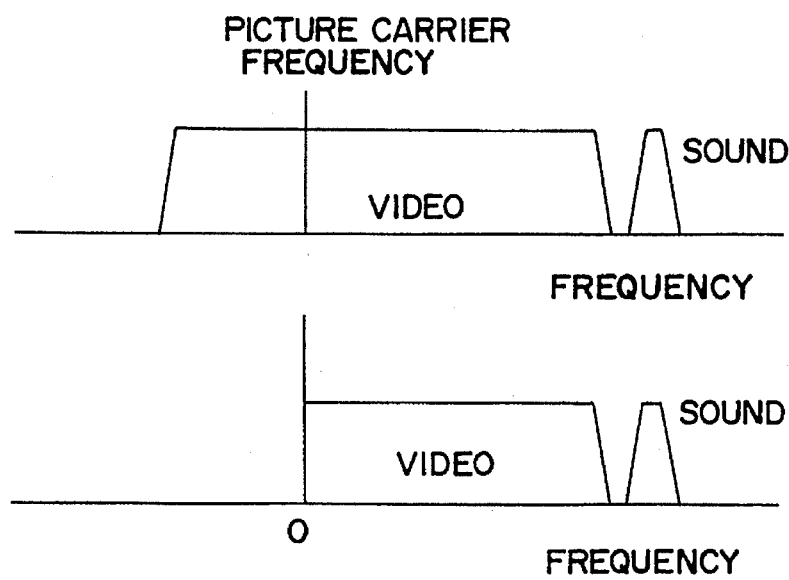
FIG. 4 illustrates the bandpass and baseband selectivity of a typical television receiver.

It has become common practice to refer to a signal as an impulse when its time domain representation is much narrower than the bandwidth of the system in question. In other words, the spectrum density of the impulse is relatively flat across the bandwidth of the system, and the frequency spectrum of the impulse extends well beyond the system bandwidth. Accordingly, the system will only accept a portion of the energy which will be shaped by the system selectivity. The time domain portion of the accepted signal is called the system impulse response, and it is wider than the theoretical impulse with a finite amplitude. The corresponding frequency domain portion of the accepted signal traces out the selectivity of the filters in the system and rolls off to zero at very high frequencies. FIG. 3 illustrates the time domain and frequency domain portions of the typical communications system at baseband. Hence, the time domain response shown in FIG. 3, referred to as the system impulse response, is representative of the frequency selectivity in communication systems with a finite bandwidth. The spectral shaping of the television signal is illustrated in FIG. 4.

Impulse noise will show up on a television screen in the baseband signal as a small bright or dark dot, depending on the phase of the impulse response in the RF and IF sections of the television receiver circuitry as compared to the carrier of the desired signal. Impulse noise typically comes in groups that produce annoying white and/or black dots throughout the picture.

In the circuitry illustrated in FIG. 2, many of the circuit elements, including the antenna 40, tuner 42, IF amplifier 44, video detector 46, video processing black level clamp and amplifier circuit 58, and comb filter 62, are substantially conventional circuits found in a conventional television receiver. When a baseband video signal is applied to a comb filter 62, shown with 1-H delay, the comb filter separates the chrominance (C) and luminance (Y) signals. The comb filter 62 can be implemented by any one of several variations of the basic comb filter 62 circuit shown. For example, some comb filters use a 2-H delay implementation. Another alternative embodiment of the comb filter employs a charged transferred device technology and includes a charged coupled device (CCD) register 1-H delay line integral with CCD circuits to accomplish the requisite transversal filter function to comb the video signal for separation of the interlaced luminance and chrominance signals. The CCD delay line is actually a plurality of serially connected storage elements from which sampled data is successfully translated from one element to the next element at a predetermined rate. The signal may be non-destructively tapped from any one or more of these storage sites in order to realize a particular signal delay. For a detailed description of a CCD comb filter circuit the reader is directed to U.S. Pat. No. 4,158,209, herein incorporated by reference.

Figure 5:
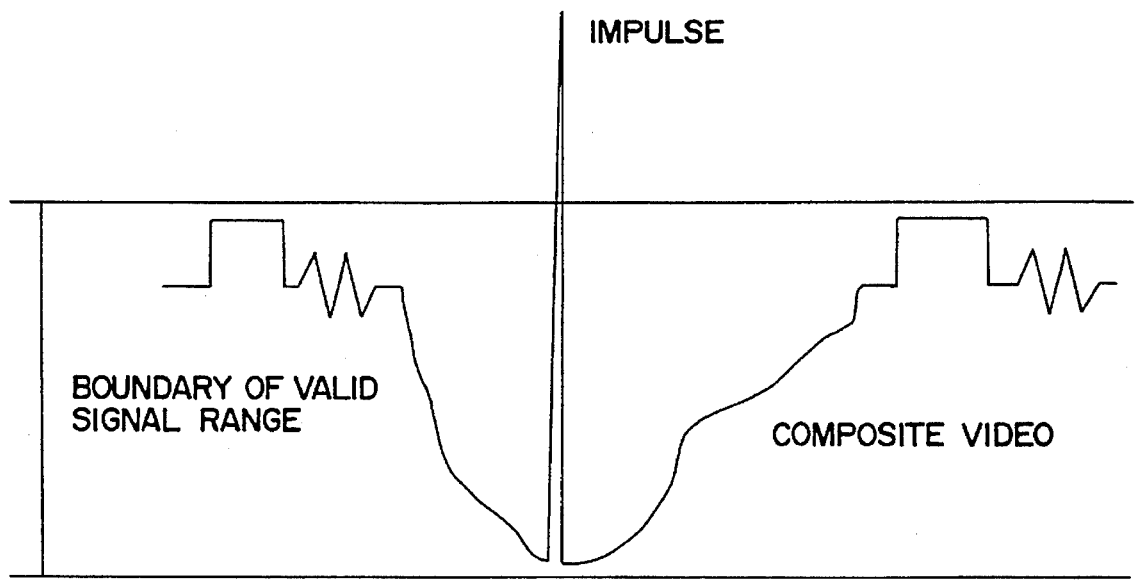
FIG. 5 illustrates an impulse signal that exceeds the boundaries of a valid signal range.

The automatic gain control (AGC) (not shown) and black level clamp circuits 58 of the television receiver circuitry provide a substantially predictable range for the amplitude of the desired video signal. The impulse noise compensation circuit 26 uses this range to implement a convenient method of sensing and ameliorating an impulse. This is realized by placing comparison circuitry in the television receiver circuit 36 that senses when the amplitude of the video is either too large or too small, and retaining the previous level of video until the impulse has passed. The effect on the video is illustrated in FIG. 5.

Turning now to the details of the circuit shown in FIG. 2, a television broadcast signal is received by an antenna 40 and applied to a tuning circuit 42. The tuner 42 translates the video signal of a particular channel to the intermediate carrier frequency (IF) of 45.75 Mhz. The 45.75 Mhz carrier is basically an amplitude modulated broadcast signal containing the composite video information. The IF signal is amplified and filtered in an IF circuit 44 then applied to a video detector 46 which thereafter translates the IF video signal to a composite baseband signal. The baseband video signal is applied through a node 48 to a video processing black level clamp and amplifier circuit 58, including an autogain control circuit (AGC) (not shown) that is responsive to the video signal from the video detector 46, and that generates a gain control signal in accordance with the amplitude of the received video signal during the horizontal blanking. The video processing black level clamp and amplifier circuit 58 establishes a dc level for the black portion of the video signal and dictates maximum and minimum signal levels. Horizontal synchronization pulses are shown indicating the maximum allowable level in FIG. 5.

The baseband video signal is then applied via a node 60 to a comb filter 62, with 1-H delay, which separates the chrominance (C) and luminance (Y) signals. The comb filter 62 can be implemented by any one of several variations of the basic comb filter 62 circuit shown. For example, some comb filters use a 2-H delay implementation. Another alternative embodiment of the comb filter employs a charged transferred device technology and includes a charged coupled device (CCD) register 1-H delay line, where the CCD delay line is actually a plurality of serially connected storage elements. The signal may be non-destructively tapped from any one or more of these storage sites in order to realize a particular signal delay.

In the comb filter arrangement 62 shown in FIG. 2, an intermediate signal is produced that contains only the high frequency luminance signal, with the delayed signal available at node 70. The comb filter 62 includes a 1-H delay circuit 66 and a summation circuit 68. Additional signal processing may be provided between the node 60 and the summation circuit 68. Whether such additional signal processing is provided or not determines whether the combing is done throughout the entire composite video signal or just the high frequency video signal. In the embodiment shown, the signal at node 70 is ultimately a combination of the delayed and undelayed signal components.

Because electrical noise signals, particularly impulse noise, in the composite video signal will produce large high frequency output in the baseband video signal, the luminance signal output at node 70 is applied to a high pass filter 74. The signal is then subsequently applied to a first comparator 76 to determine if the high frequency output is greater than a predetermined value. The high pass filter 74 is used if the comb filter 62 does not have enough selectivity to eliminate the sound carrier. The output from the first comparator 76 is applied to a first input terminal of a first AND gate 78. The second input terminal of the first AND gate 78 is received from the MPU 24, discussed in detail above, which is activated upon user selection. Thus, the high frequency luminance signal is used to reduce impulse noise in the broadcast picture signal when the user is experiencing picture problems.

As previously noted, an impulse usually produces a large high frequency output in the baseband section of the composite video signal. Similarly, the chrominance signal, handled by the chroma circuits 54, may also produce large signals on some scenes in the high frequency region of the baseband video. This, though, is not a problem because most new televisions have comb filters, such as the comb filter 62 shown, that separate the chrominance and luminance signals. Reliable detection of impulse noise signals by way of the luminance signal is thereby possible.

The amplitude variations in the composite video signal correspond to light and dark areas of the picture as determined by the video processing black level clamp and amplifier circuit 58. After being combed free of the chrominance signal by the comb filter 62, the signal is also applied through node 70 to a second comparator 84 and a third comparator 86. The second comparator 84 determines whether the amplitude of the detected video derived from the composite video signal is less than a first predetermined value, and the third comparator 86 determines whether the amplitude of the detected video derived from the composite video signal is greater than a second predetermined value. Both the first and second predetermined values are based on the video processing black level clamp and amplifier circuit 58, which determines the minimum and maximum amplitude values of the composite video signal.

The logic signals from the second comparator 84 and the third comparator 86 are applied to the OR gate 88. The signal from OR gate 88 is in turn applied to a first terminal of a second AND gate 80, while the second terminal of the second AND gate 80 receives input from the MPU 24. The output from the second AND gate 80 is input to a third AND gate 82, along with the output from the first AND gate 78. This ensures that the tracking and hold circuitry 72, i.e. the compensation circuitry, will only be activated if the composite video signal falls outside of the predetermined minimum or maximum amplitude levels, the high frequency luminance signal is greater than a predetermined range, and the user enables the circuitry. An alternative embodiment would eliminate the user control and allow the tracking and hold circuit 72 to switch automatically upon detection of an impulse.

Figure 6:
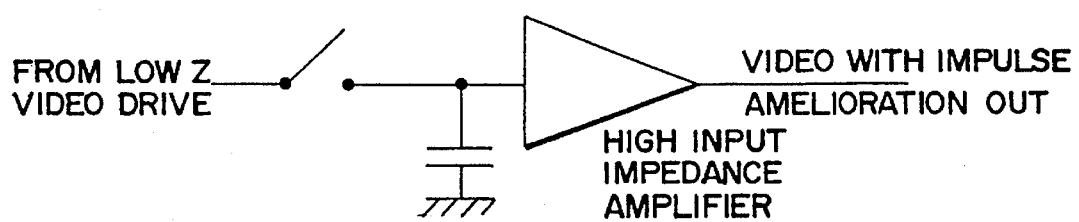
FIG. 6 illustrates the typical configuration of a tracking and hold circuit suitable for use in connection with the present invention.

There are many known ways of implementing a suitable tracking and hold circuit. One example is to use a series transmission gate that feeds a shunt capacitor to ground, loaded only by a high impedance amplifier. The circuit shown in FIG. 6 is one example of such a tracking and hold circuit to be inserted in the normal video processing path of the television. This type of circuit passes the video unchanged until the hold control is activated. When the hold is activated, the level of the output signal from the tracking and hold circuit 72 remains at the last signal level before the hold was activated. Because a true impulse would be of short duration, the circuit would not only inhibit the impulse from passing, it would cause very little, probably imperceptible, distortion of the signal.

In contrast, using the high frequency luminance signal to detect a longer duration signal may not be effective. Unlike an impulse, the frequency spectrum of a longer duration disturbance typically will not extend beyond the system bandwidth. Thus, there would be no way to detect the longer duration disturbance using the high frequency luminance signal because the disturbance will not produce a large high frequency output in the baseband video signal. Longer duration disturbances are defined here as those disturbances having a duration of greater than or equal to 2 μs. It will be understood by those in the art, however, that an exact value for the signal duration is dependent upon circuit design and may be less than 2 μs.

Furthermore, because of the longer duration of the disturbance it becomes impractical to substitute the signal level of the previous signal immediately before the disturbance, as is done for an impulse noise disturbance. To do so would cause the circuitry to hold the signal output for a significant portion of the horizontal line creating undesirable effects. Therefore, the longer duration disturbance detection circuit 73 looks for a composite video signal that is outside of the normal video signal voltage range and, in response thereto, repeats the correct portion of the previous line.

Accordingly, another important feature of the compensation circuit shown in FIG. 2 is its ability to detect a disturbance signal then has a longer duration, and therefore a narrower bandwidth than impulse noise. A longer duration disturbance signal detection circuit 73 and a longer duration noise compensation circuit 28, responsive to the detection circuit 73 and an enable signal 2 from the MPU monitor are shown in FIG. 2. Because the comb filter 62 will either use 1-H or 2-H delay, a version of the previous line is available by switching to the appropriate node on the comb filter and tapping the appropriate storage element, not shown, when the longer duration detection circuit 73 indicates that a longer duration disturbance signal is present. The tapped storage element output 67 is shown as an input to the longer duration noise compensation circuit 28 in FIG. 2.

In the embodiment shown, the comb filter 62 is serially connected in the video signal circuit between the video detector 46 and further processing circuitry connected at the second and third comparators, 84 and 86. This allows the delayed signal output from the 1-H delay line 66 to be temporarily substituted for the real time signal or current video applied at input node 60 when signal defects, i.e. longer duration noise, have been determined to be present in the real time signal. Thus, the signal previously delayed by 1 horizontal image line is recycled in the comb filter register, and can be applied in the event of further electrical noise.

Figure 7:
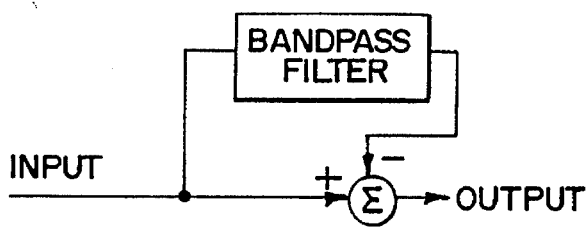
FIG. 7 illustrates one example of a notch filter made from a bandpass filter.
Figure 8:
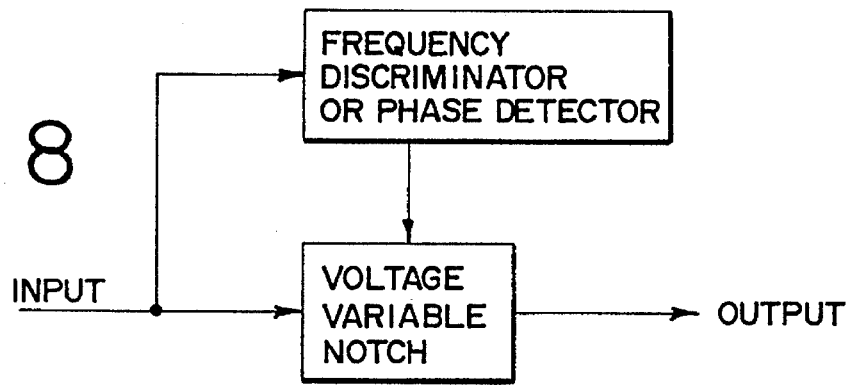
FIG. 8 illustrates a voltage variable notch filter for tracking a CW or carrier input signal.
Figure 9:
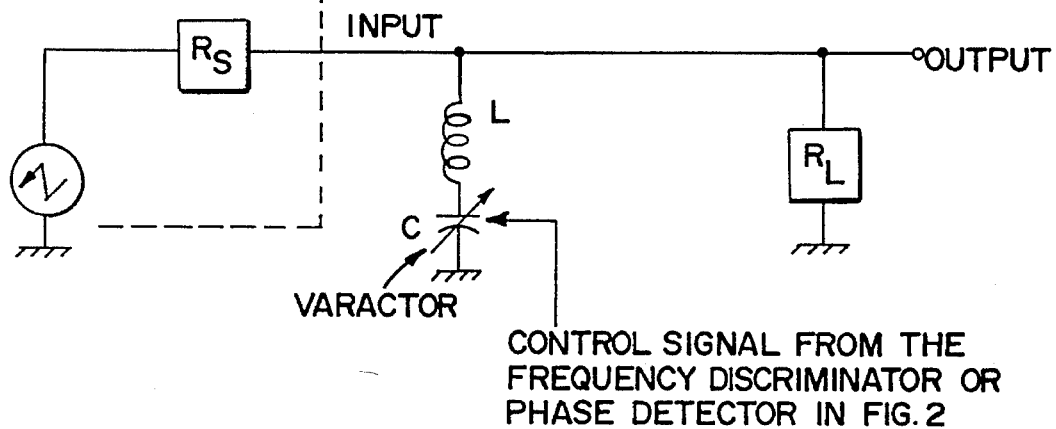
FIG. 9 illustrates an example of a voltage variable notch filter circuit.
Figure 10:
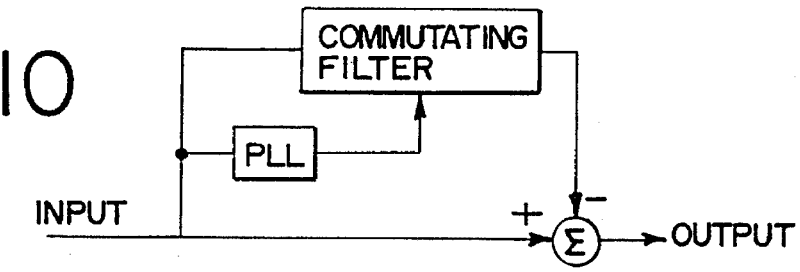
FIG. 10 illustrates an alternative approach to designing a circuit to eliminate CW disturbances by using a bandpass filter whose center frequency is proportional to the clock signal that is being developed from a tracking filter.

As with longer duration signals, it is also impractical to substitute the signal level of the previous signal when confronting a carrier signal that is continuous in nature, i.e. a CW signal. Substituting the previous signal or repeating the correct portion of the previous line would likely create undesirable effects when the disturbance is a CW or carrier signal. Accordingly, another embodiment of the present invention would address CW disturbing signals. This type of disturbance can be handled by a tracking filter that looks for a CW disturbance signal and adjusts a notch filter to the appropriate frequency to attenuate the unwanted disturbance. FIG. 7 provides one example of how to make a notch filter from a bandpass filter. The goal is to make a notch filter that tracks a CW input signal and rejects it from the output signal. FIG. 8 is yet another approach that uses a frequency discriminator or phase detector to control a voltage variable notch filter to automatically tune it to the CW frequency. FIG. 9 is an example of a suitable notch filter circuit that uses an inductor (L) and varactor (C) in parallel with an output impedance (R). The filter is controlled using a frequency discriminator to control the varactor C. FIG. 10 shows another approach for designing the circuit to eliminate CW disturbances by using a bandpass commutating filter whose center frequency is proportional to the clock signal that is being developed from a tracking filter, shown in FIG. 10 as a phase-locked loop (PLL) circuit. The filtering circuits in FIGS. 7–10 can be individually substituted for the CW noise compensation circuit 30 shown in FIG. 2, connected such that the filtering circuit used will be in cascade with the other individual interference compensation circuits. The CW noise compensation circuit 30 used will be responsive to a CW detection circuit 77, which may be either integral with the compensation circuit as in the notch filter of FIG. 7 or which may be a separate circuit, and an enable signal 3 from the MPU as shown in FIG. 2.

Thus, it can be seen from the above detailed description that the present invention achieves several advantages. In particular, the circuit and method of the present invention provides apparatus and method for organizing and controlling the individual circuits that comprise a television noise reduction control system. The invention further provides a television noise reduction control system which allows the user to control how and when individual noise reduction circuits in the system are used. The present invention also reduces or eliminates the potentially unpredictable reactions of a noise reduction circuit when it receives a type of noise or other signals that it was not designed to process. This is accomplished by allowing the user to activate an individual noise reduction circuit in the system only when it is needed. This is also accomplished by providing a circuit capable of effectively detecting more than one type of noise signal. Finally, the invention described herein provides reliable individual television noise reduction circuits which can be used alone or in a television noise reduction control system.

It is therefore intended that the foregoing detailed description be regarded as illustrative rather than limiting, and that it be understood that it is the following claims, including all equivalents, which are intended to define the scope of the invention.

I claim:

1. A circuit for controlling the effects of noise signals in television receivers, the circuit comprising:
    input circuitry that receivers an RF television signal and generates a composite baseband signal;
    at least one noise compensation circuit that receives said composite baseband signal and compensates for noise in said composite baseband signal; and
    a user-controlled control circuit, coupled to said at least one noise compensation circuit, and capable of selectively enabling said at least one noise compensation circuit.

2. The invention of claim 1 wherein said at least one noise compensation circuit includes an impulse noise compensation circuit.

3. The invention of claim 1 wherein said at least one noise compensation circuit includes a longer-duration noise compensation circuit.

4. The invention of claim 1 wherein said at least one noise compensation circuit includes a continuous wave noise compensation circuit.

5. The invention of claim 1 wherein said at least one noise compensation circuit comprises:
   an impulse noise compensation circuit;
   a longer-duration noise compensation circuit; and
   a continuous wave noise compensation circuit.

6. The invention of claim 1 wherein said user-controlled control circuit comprises a microprocessor.

7. The invention of claim 6 wherein:
   said microprocessor is programmed to present a graphic menu of options on a screen of said television; and
   a user is capable of instructing said microprocessor to enable at least an impulse noise compensation circuit, a longer duration noise compensation circuit and a continuous wave compensation circuit, by activating a control switch which chooses one of said options.

8. The invention of claim 1 wherein said at least one noise compensation circuit comprises:
   a first circuit that detects an amplitude of a composite baseband signal; and
   a second circuit that detects a high frequency luminance signal component of said composite baseband signal.

9. The invention of claim 8 wherein said first circuit further comprises:
   a first comparator that compares said amplitude of said composite baseband signal to an upper limit; and
   a second comparator that compares said amplitude of said composite baseband signal to a lower limit.

10. The invention of claim 8 wherein said first circuit further comprises:
    a comb filter that identifies a high frequency component of said composite baseband signal;
    a high pass filter that receives said high frequency component; and
    a comparator that receives the output of said high frequency component and compares it to an upper limit.

11. The invention of claim 1 wherein said at least one noise compensation circuit receives an amplitude of said composite baseband signal, along with a high frequency luminance component of said composite baseband signal.

12. A circuit for controlling the effects of noise signals in television receivers, the circuit comprising:
    input circuitry for receiving an RF television signal and generating a composite baseband signal;
    at least one noise compensation circuit that receives said composite baseband signal and compensates for noise components in said composite baseband signal; and
    a control circuit, which is coupled to said at least one noise compensation circuit, and which selectively enables said at least one noise compensation circuit;
    said at least one noise compensation circuit comprising:
    a first circuit that detects an amplitude of said composite baseband signal; and
    a second circuit that detects a high frequency luminance signal component of said composite baseband signal.

13. The invention of claim 12 wherein said first circuit further comprises:
    a first comparator that compares said amplitude of said composite baseband signal to an upper limit; and
    a second comparator that compares said amplitude of said composite baseband signal to a lower limit.

14. The invention of claim 13 wherein said first circuit further comprises:
    a comb filter that identifies a high frequency component of said composite baseband signal;
    a high pass filter that receives said high frequency component; and
    a comparator that receives the output of said high frequency component and compares it to an upper limit.

15. In a television receiver having detection circuitry for receiving a composite television signal having an amplitude modulated broadcast picture signal component and a high frequency luminance signal component, the detection circuitry comprising:
    a first comparator that senses when the amplitude of the amplitude modulated broadcast picture signal exceeds a first predetermined value;
    a second comparator that senses when the amplitude of the amplitude modulated broadcast picture signal is less than a second predetermined value; and
    a third comparator that senses when the high frequency luminance signal exceeds a third predetermined value.

16. The television receiver circuitry of claim 15 wherein the detection circuitry comprises a first circuit which produces a control signal.

17. The television receiver circuitry of claim 16, wherein the first circuit further comprises:
    a logical OR gate having a first input terminal connected to the output of the first comparator and a second input terminal connected to the output of the second comparator;
    a first logical AND gate having a first input terminal connected to the output of the logical OR gate and a second input terminal connected to the output of a microprocessor unit;
    a second logical AND gate having a first input terminal connected to the output of the third comparator and a second input terminal connected to the output of the microprocessor unit; and
    a third logical AND gate having a first terminal connected to the output of the first logical AND gate, a second terminal connected to the output of the second logical AND gate, and an output terminal for generating the control signal.

18. The television receiver circuitry of claim 16, wherein compensation circuitry that reduces the effects of impulse noise is responsive to the control signal.

19. The television receiver circuitry of claim 18, wherein the compensation circuitry holds an output signal level at a level that occurred just prior to the detection of said impulse noise.

20. The television receiver circuitry of claim 19, wherein the compensation circuitry includes a tracking and hold circuit comprising:
    a series transmission gate responsive to the control signal;
    a shunt capacitor at the output end of the transmission gate; and
    a high impedance amplifier at the output end of the transmission gate.

21. A circuit for controlling the effects of noise signals in television receivers, the circuit comprising:
    input circuitry that receives an analog RF television signal and generates a composite baseband signal;
    at least one noise compensation circuit that receives said composite baseband signal and compensates for noise in said composite baseband signals; and
    a user controlled control circuit, coupled to said at least one noise compensation circuit, and capable of selectively enabling said at least one noise compensation circuit.

22. The invention of claim 21 wherein said at least one noise compensation circuit includes an impulse noise compensation circuit.

23. The invention of claim 21 wherein said at least one noise compensation circuit includes a longer-duration noise compensation circuit.

24. The invention of claim 21 wherein said at least one noise compensation circuit includes a continuous wave noise compensation circuit.

25. The invention of claim 21 wherein said at least one noise compensation circuit comprises:

an impulse noise compensation circuit;

a longer-duration noise compensation circuit; and a continuous wave noise compensation circuit.

26. The invention of claim 21 wherein said user controlled control circuit comprises a microprocessor.

27. The invention of claim 21 wherein:

said microprocessor is programmed to present a graphic menu of options on a screen of said television; and a user is capable of instructing said microprocessor to enable at least an impulse noise compensation circuit, a longer duration noise compensation circuit, and a continuous wave compensation circuit by activating a control switch which chooses one of said options.

* * * * *